(12) United States Patent
Van Luchene

(10) Patent No.: US 8,454,431 B2
(45) Date of Patent: *Jun. 4, 2013

(54) CHARACTERS INTERACTIONS IN A VIDEO GAME OR OTHER VIRTUAL ENVIRONMENT MANAGED BY AN AUTOMATED SYSTEM

(75) Inventor: Andrew Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/311,699

(22) Filed: Dec. 6, 2011

(65) Prior Publication Data

US 2012/0077599 A1    Mar. 29, 2012

Related U.S. Application Data

(63) Continuation-in-part of application No. 11/368,143, filed on Mar. 3, 2006, now Pat. No. 7,677,974, and a continuation-in-part of application No. 11/694,669, filed on Mar. 30, 2007, now Pat. No. 7,690,997, and a continuation-in-part of application No. 11/421,025, filed on May 30, 2006, now Pat. No. 7,690,990, and a continuation-in-part of application No. 11/621,880, filed on Jan. 10, 2007, now Pat. No. 7,806,758, and a continuation-in-part of application No. 12/754,810, filed on Apr. 6, 2010, now Pat. No. 8,070,599, and a continuation-in-part of application No. 12/754,805, filed on Apr. 6, 2010, now Pat. No. 8,070,596.

(51) Int. Cl.
*G06F 17/00* (2006.01)

(52) U.S. Cl.
USPC .......................................................... 463/25

(58) Field of Classification Search
USPC ................................... 463/16–25; 705/1, 25
See application file for complete search history.

(56) References Cited

U.S. PATENT DOCUMENTS

| | | | |
|---|---|---|---|
| 6,545,682 B1 * | 4/2003 | Ventrella et al. | 345/473 |
| 2006/0178964 A1 * | 8/2006 | Jung et al. | 705/35 |
| 2006/0190282 A1 * | 8/2006 | Jung et al. | 705/1 |
| 2006/0190284 A1 * | 8/2006 | Jung et al. | 705/1 |
| 2009/0013274 A1 * | 1/2009 | Haghanegi | 715/764 |

* cited by examiner

Primary Examiner — Ronald Laneau

(57) ABSTRACT

In various embodiments, systems generate a video game or other virtual environment and player characters in the video game can form different types of interactions and relationships. Some relationships provide benefits and/or obligations. The video game facilitates the monitoring, forming and terminating of various kinds of relationships.

14 Claims, 2 Drawing Sheets

CHARACTERS INTERACTIONS IN A VIDEO GAME OR OTHER VIRTUAL ENVIRONMENT MANAGED BY AN AUTOMATED SYSTEM

This application is a continuation-in-part of each of the following U.S. patent applications, and each of the following applications is incorporated herein by reference:

U.S. patent application Ser. No. 11/368,143, entitled "Video Game Methods and Systems" filed Mar. 3, 2006 now U.S. Pat. No. 7,677,974;

U.S. patent application Ser. No. 11/694,669, entitled "Virtual Environment with Formalized Inter-Character Relationships", filed Mar. 30, 2007 now U.S. Pat. No. 7,690,997;

U.S. patent application Ser. No. 11/421,025, entitled "Financial Institutions and Instruments in a Virtual Environment", filed May 30, 2006 now U.S. Pat. No. 7,690,990;

U.S. patent application Ser. No. 11/621,880, entitled "Video Game Including Child Character Generation Using Combination of Parent Character Attributes", filed Jan. 10, 2007 now U.S. Pat. No. 7,806,758

U.S. patent application Ser. No. 12/754,810, entitled "Apparatus and methods facilitating the use of financial transactions in a virtual environment", filed Apr. 6, 2010 now U.S. Pat. No. 8,070,599; and U.S. patent application Ser. No. 12/754,805, entitled "System which manages relationships between characters in a video game or other virtual environment", filed Apr. 6, 2010 now U.S. Pat. No. 8,070,596.

DETAILED DESCRIPTION

Figure 1:
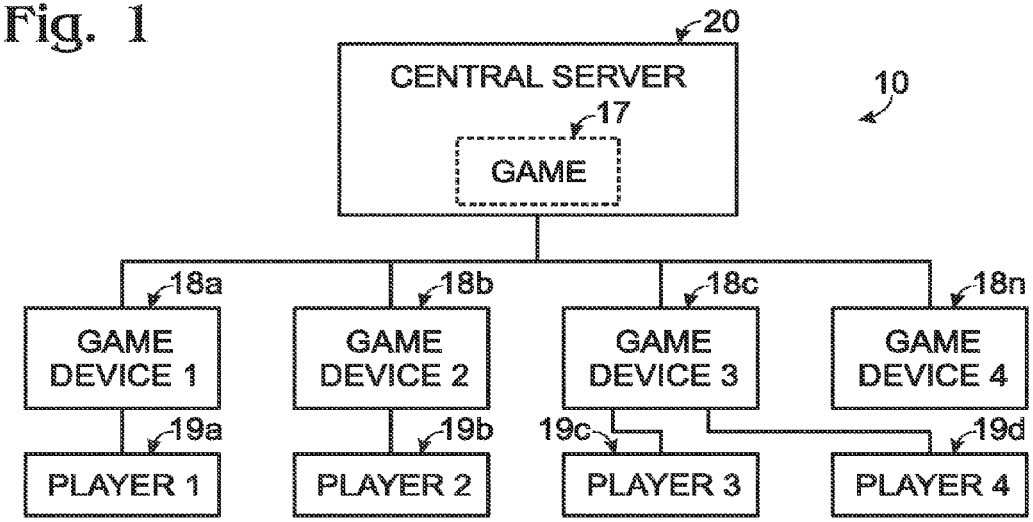
FIG. 1 illustrates a system according to an embodiment.

The following sections I-X provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise. Two or more described embodiments may or may not be mutually exclusive. The mere fact that two embodiments are described, or that two embodiments are described in proximity to each other or in conjunction with each other, does not imply that the two embodiments are mutually exclusive. A described embodiment may or may not be strictly narrower than and encompassed by another described embodiment. The mere fact that two embodiments are described, or that two embodiments are described in proximity to each other or in conjunction with each other, does not imply that one of the embodiments is strictly narrower than and encompassed by the other embodiment.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments would cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well as another example, the sentence "Examples of machines include a computer and a motor" means that one example of a machine is a computer, another example of a machine is a motor, and there may be other examples (e.g., things that are neither computers nor motors may nevertheless be a machine)

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The indefinite articles "a" and "an" and the definite article "the" refer to "one or more" of the noun modified by that article, unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the specific single feature," then the word "the" should be understood to refer to the previously mentioned "a specific single feature."

The term "plurality" means "two or more", unless expressly specified otherwise.

A "set" of things (e.g., a set of widgets) may include one or more of those things (e.g., one or more widgets), which are members of the set. Whether the set includes a particular item as a member is synonymous with whether a set includes the particular item.

A "subset" of things (e.g., a subset of widgets) may include one or more of those things. A subset does not imply that there must be in the subset fewer things than in some other set of things. A subset of a particular set may include some or all of the members of the set.

A reference to a "plurality" (and like terms such as "at least one", "one or more", "set" and the like) has inherent antecedent basis for the "number" of things included in the plurality (or in the set, etc.). For example, in the phrase "receiving a plurality of commands", there is inherent antecedent basis for "the number of commands". For example, in the phrase "receiving a set of commands", there is inherent antecedent basis for "the number of commands".

The term "herein" means "in the present application, including anything which may be incorporated by reference", unless expressly specified otherwise.

The phrase "at least one of" is equivalent to "one or more of", and when either such phrase modifies a plurality of things (such as an enumerated list of things), such phrase means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". Therefore, the phrase "based on" is equivalent to the phrase "based at least on" and is also equivalent to the phrase "based at least in part on". For example, the phrase "element A is based on element B and element C" covers embodiments where element A is calculated as the product of B times C (in other words, A=B×C) and where A is calculated as the sum of B plus C (in other words, A=B+C).

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" precedes do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "time", when used as a determined quantity, means any sort of time (e.g., time of day, day of week, date, year) on which one or more things are determined to occur.

The term "period of time" means any sort of duration (e.g., number of seconds, number of minutes, other durations) of one or more things.

The term "good" generally refers to anything which may be provided in exchange for money or other value, and thus "good" includes services, rights and items, whether tangible or intangible.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

Similarly, in the phrase "for each of the plurality of widgets, determining a respective price of the widget, a reference to "the widget" in that phrase means the "determining" step is applied to (performed for) each widget of the plurality of widgets. The phrase "the respective prices of the plurality of widgets" thus means the set which includes as members each respective price of the plurality of widgets.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers within the range, unless expressly specified otherwise. For example, the range "1 to 10" includes the integers from 1 to 10 (e.g., 1, 2, 3, 4, . . . 9, 10) and non-integers (e.g., 1.1, 1.2, . . . 1.9). A range may be denoted as non-inclusive explicitly, such as "the range of voltages from 2.5 volts to 10.3 volts exclusive", and such a range excludes 2.5 volts and excludes 10.3 volts.

A range can be continuous or discrete. For example, the range "from three meters to five meters" is a continuous range. The range "integer ranges from three meters to five meters" is a discrete range.

A range includes two ends, and each such end is, where the range is inclusive, a thing that is included in the range. Thus a range inherently has antecedent basis for the term "the ends", and has antecedent basis for the term "an end" and has antecedent basis for the terms "the first end" and "the second end". Where the range is ordered or may be ordered (e.g., a range of integers that may be ordered numerically, a range of text that may be ordered alphabetically) the range includes ends that are distinguishable because of their respective ordering. Thus a range that may be ordered has antecedent basis for terms that denote the place of the end in the ordering scheme (e.g., a range that can be numerically ordered has a "low end" and a "high end").

When used to compare values (e.g., integers, fractions) which are capable of being ordered with respect to each other, the phrase "not greater than" is equivalent to "less than or equal to". Similarly, the phrase "not less than" is equivalent to "greater than or equal to".

In reference to a plurality of things (e.g., a plurality of widgets) superlatives, where a superlative may be applied to the plurality (e.g., the largest widget of the plurality of widgets, the lowest price of the set of prices) and there is inherently antecedent basis for such superlative.

For example, for a plurality of numbers, there is inherent antecedent basis for the phrase "the greatest number of the plurality of numbers", e.g., since numbers can be ordered from least to greatest and thus the greatest number is readily and unambiguously ascertainable—the greatest number is that number of the plurality of numbers which is greater than all other numbers of the plurality of numbers. Similarly, in an embodiment where there are two equal numbers, and both numbers are greater than all other numbers in the plurality, then there are two greatest numbers.

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, heuristically "best guessing", averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. Thus, the mere usage of the ordinal number "first" does not indicate that there must be a "second". For example, the use of the phrase "a first widget" does not imply that there be a second widget. Accordingly, it would not be ambiguous or indefinite to use in a claim the term "a first widget" where no "second widget" is recited in that claim (or in any other claim it depends on). The mere usage of the ordinal number "second" or greater ordinal numbers does not indicate that there must be a "first" or any lesser ordinal number. For example, the use of the phrase "a second plurality of widgets" does not imply that there be a first plurality of widgets. Accordingly, it would not be ambiguous or indefinite to use in a claim the term "a second plurality of widgets" where no "first plurality of widgets" is recited in that claim (or in any other claim it depends on). A term which is labeled by an ordinal number is different than a term that is not modified by any ordinal number. For example, in a claim a reference to "a green widget" and a reference to "a second green widget" means that there are references to different widgets and thus there is no ambiguity as to whether the second green widget is or is not a reference to the green widget. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. (Conversely, a single computer-based device may be substituted with multiple computer-based devices operating in cooperation with one another.) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. §1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed inventions are widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims recite purposes, benefits and possible uses of the claimed invention only and do not limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g. weeks at a time). In addition, devices that are in communication with each other may communicate directly or indirectly through one or more intermediaries. Devices are in communication with one another if they are capable of one-way communication with one another. For example, a first device and a second device may be in communication with one another if the first device is capable of transmitting information to the second device, and the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the process.

A computer readable medium can be in communication with a processor such that the processor can receive some or all of the instructions stored on the computer readable medium. Likewise the processor can execute some or all of the instructions stored on the computer readable medium, and can execute different instructions at different times.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks, semiconductor memory (e.g., RAM, ROM, flash drives, semiconductor hard drives). Therefore, for example, a tangible computer-readable medium is not a carrier wave or an RF transmission.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCPorIP, TDMA, CDMA, and 3G; and/or (iv) encrypted to ensure privacy or prevent fraud in any of a variety of ways well known in the art.

A "user interface" is 'used by' a device, such as a computing device, to provide outputs to a user and to receive inputs from a user. For example, the user interface may direct the device to display (or otherwise provide) certain outputs (as defined by the user interface), and allow inputs to be received from the user via the device. In an embodiment, in order for the device to generate the user interface, the device executes certain instructions, e.g., instructions to output data and receive data as inputs. A user interface can include one or more output controls which output data and/or one or more input controls which allow data to be received. A type of input control allows a selection of an option from among a plurality of options, and may allow only one option to be selected, may allow one or more options to be selected, may allow that a predetermined number of options are selected, may allow that no options are selected. An input control may define the format of type of input that may be entered. A control may function as both an input control and as an output control.

A description of different capabilities of a user interface (e.g., by describing different embodiments of a user interface, by describing different things that a user interface can do) does not mean that in all embodiments the user interface must include all such described capabilities. On the contrary, such description also supports an embodiment in which, e.g., a user interface has only one of the described capabilities, and supports an embodiment in which a user interface has a particular combination of less than all of the described capabilities.

A description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as those described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal, from the scope of the invention, of additional, different embodiments, and similarly references to the description of embodiments which all include a particular feature do not indicate a disclaimer or disavowal of embodiments which do not include that particular feature. A clear disclaimer or disavowal in the present application will explicitly refer to the scope of the invention as disclaiming or disavowing certain subject matter and will also be prefaced by a phrase such as "does not include" or "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Conversely, the definitions and other subject matter explicitly set forth in this application should not be used to limit, define, or otherwise construe any term of any document incorporated herein by reference. Nothing explicitly set forth in this application should be interpreted as an admission or characterization of any prior art to this application.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

XI. Additional Embodiments

Players commonly access online games through a network such as the Internet, and may or may not be required to purchase additional software or hardware in order to play the game. Massive multi player online games (MMOGs) or massive multi-player role-playing games (MMORPGs) are computer games that are capable of supporting hundreds, thousands, or millions of players simultaneously. Typically, these types of game are played in a giant persistent world where the game continues playing regardless of whether or not real players are logged in. Such networks allow for people all over the world to participate and interact with each other in a virtual environment. The present disclosure provides systems and methods which contribute to the evolution and longevity of such a game.

Virtual Environments which are accessible to multiple subscribers via a server are known. For example, hundreds of thousands of players access games known as massive multi player online games (MMOGs). Players of these games customarily access a game repeatedly (for durations typically ranging from a few minutes to several days) over given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community. Virtual communities like Linden Lab's "Second Life" provide a three-dimensional metaverse in which people (who may or may not pay a fee for the right to access the metaverse) create avatars that are able to interact with other avatars as well as the local environment.

According to one or more embodiments, the present invention provides a metaverse in which two or more entities are able to create formalized relationships with each other. In this embodiment, a relationship may enable the two or more entities to undertake obligations and/or receive benefits that are not available to entities that have not formed such relationships. Non-limiting examples of relationships that might be available in a metaverse include: marriage, parent/child, slave/master, affair, enchanter/enchanted, boss/employee, gods/worshipers, government officials, sports teams/coaches, guilds, general/army, friend-friend, group leader-group member and the like. Each type of relationship may include its own set of obligations and benefits which are different from other types of relationships.

A "game" as used herein need not be a "game" in the traditional sense of a competition in which a winner and/or loser is determined, but rather that the term "game" incorporates the idea of the metaverse regardless of the intended purpose. Accordingly, both World of Warcraft and Second Life would be referred to as games for the purposes of the present disclosure. Moreover, a person or entity who enters the metaverse in order to conduct business, tour the metaverse, or simply interact with others or the virtual environment, with or without competing against another entity is still considered to be "playing a game."

The term "player" is intended to describe any entity that accesses the metaverse, regardless of whether or not the player intends to or is capable of competing against other players. Typically, a player will register an account with a Video Game Central Server or within a peer-to-peer network and create Characters that can interact with other Characters in a Video Game Environment.

Character—may include a persona created by a player in a metaverse.

Avatar—may include the physical embodiment of a character in the metaverse.

Character Account—may include an account that tracks character attributes.

Character Attribute—may include any quality, trait, feature or characteristic a particular Character can have that is stored in the corresponding Character Account. Character Attributes may include, but are not limited to: 1. A character score 2. A virtual object 3. The physical appearance of a character 4. An emblem or mark 5. A synthetic voice 6. Virtual money 7. Virtual help points or credits 8. The ability to join groups of other players at a later time 9. A score for subsequent matching of later game parameters 10. A relationship with another character 11. A genetic profile or makeup Character Life—may include a fixed period of virtual or real world time that a player character can exist in a game environment.

Character Skills—may include game attributes inherent or acquired by a player character during game play such as, but not limited to: the ability to cast certain spells, foretell the future, read minds, use certain weapons, cook, hunt, find herbs, assemble herbs into potions, mine, assemble objects into other objects, fly, and/or enchant other player characters.

Non-Player Character (NPC) or Computer Generated Character (CGC)—may include any character that is generated by the system rather than being another player character.

Game Parameter—may include any part of a metaverse experience by which characters can be measured. Game Parameters may include, but are not be limited to: 12. Completing all or part of a mission in a game 13. Playing for a certain period of time 14. Winning a match against another player character or computer generated character 15. Reaching a certain level or score 16. using or obtaining an ability or technology 17. kill/death ratios 18. obtaining an object 19. solving a puzzle 20. accuracy with weapons 21. effective use of the proper weapon 22. killing a certain character/creature 23. getting through or to a certain geographic area 24. decreasing or increasing Karma Points 25. getting, buying, exchanging or learning a new skill or player attribute 26. having a child 27. getting married 28. obtaining, buying, trading, producing or developing raw materials 29. producing goods or services 30. earning income 31. earning a higher rank in an army 32. winning an election among two or more player characters 33. achieving deity status 34. improving player character status or caste 35. assisting other player characters with any of the above 36. speed of accomplishing any of the above Virtual Contract—may include an enforceable agreement between two entities in a metaverse. Some examples of virtual contracts are provided in U.S. Provisional Patent Application Ser. No. 60/652,036, which is hereby incorporated by reference in its entirety for all purposes.

Player to Player Contract—may include a virtual but binding contract between player characters that allows the players to provide or exchange game attributes to one another. Once a player-to-player contract is established, the game server or peer-to-peer network automatically distributes acquired game attributes between the player characters based on the contract conditions.

Billing Information—may include any information pertaining to billing a player including a billing address, credit card account, bank account, pay pal account or other payment information.

In-game Marketplace—may include a virtual environment where Characters can exchange Attributes.

Novice Player—may include a player that is flagged as requiring the help of an expert to complete a Game Parameter.

Player Account—may include an account on the Video Game Central Server or within a peer-to-peer network that contains a Player profile including personal, billing, and character account information.

Player Attribute—may include any attribute that can be applied to a player account. Player Attributes shall include, but not be limited to: 37. Real Money 38. Discount of monthly fees for playing game 39. Monthly fee for playing a game 40. Global character attribute settings for all characters created by player across multiple games. 41. Rewards for encouraging another player to signup to play Virtual—implies in a computer-generated environment or other intangible space.

Metaverse—includes a collection of online virtual environments which are accessible to one or more players of one or more online games or communities. Areas of a metaverse may be restricted to some players. Examples include Massive Multi Player Online Video Game (MMPOVGs) such as World of Warcraft and virtual communities such as Second Life. MMPOVGs (sometimes referred to as Massive Multi Player Online Role Playing Games MMPORPGs) include video games and virtual environments that are provided by and accessed with either a network of a Video Game Central Server and at least two Video Game Consuls or a peer-to-peer network of at least two Video Game Consuls. Players create Characters, or avatars, that may interact with each other in a Metaverse that is stored on the Video Game Central Server and the Video Game Consuls.

Video Game Console—may include a device comprising a CPU, memory and optional permanent storage residing at a player location that can allow for the playing of video games. Examples include, home PCs, Microsoft Xbox, and Sony Playstation.

Video Game Central Server—may include a CPU, memory and permanent or temporary storage that is connected to multiple Video Game Consuls that allows for Massive Multi Player Online Video Games to be played.

Virtual or Game environment—may include a region, sub-region or area of a metaverse such as a country, city, era, building, etc., which is in some way recognizably different from another region, sub-region, or area of the metaverse.

As stated above, the present disclosure provides numerous methods and systems in which players can form, enter into, and terminate formalized relationships with each other and various entities, including non-player characters, in a metaverse. The game server may provide any number of methods by which characters can formalize their relationships. Non-limiting methods by which a formalized in-game relationship can be formed include: 42. An in-game negotiated virtual contract between two player characters. Examples of virtual contracts are described, for example, in U.S. patent application Ser. No. 11/355,232 "Online Game Environment that Facilitates Binding Contracts Between Player Characters" filed Feb. 14, 2006, and Ser. No. 11/611,050 "Online Game Environment that Facilitates Sponsorship Contracts" filed Dec. 14, 2006, both of which are hereby incorporated by reference. 43. At random—characters may be randomly assigned relationships by the game server, other characters, other players, or by some other means. 44. Based on proscribed rules designed and/or controlled by the game server, game players, peer-to-peer network, or some other entity. For example, the rules of the game server may indicate that any two characters who complete a particular task together must marry each other at the conclusion of the task. Alternatively or additionally, the rules may specify that any time a new player character is created in the game, one or more relationships are automatically established by the game server, or within the peer-to-peer network between the new character and existing characters in the game. For example, new characters may only be able to enter the game as children of characters already in the game. Accordingly, a character who enters the game would automatically be in a relationship with his or her parents, and any existing siblings or extended family members.

When and if an entity can enter into a formalized relationship may be determined by any number of conditions or requirements. These conditions and/or requirements may be based on a wide variety of factors including, for example, the type of entity entering into the relationship. For example, the type of relationship(s) that can be formed between two player characters may be different from the relationship(s) that can be formed between a player character and an NPC. Moreover, the roles that each entity may take in the relationship may be similarly determined by the type of entity entering into the relationship. For example, an NPC may be able to enter into a Parent/Child relationship as a child, but not as a parent, while a player character may be able to enter into a master/slave relationship as a master, but not as a slave.

Other conditions and/or requirements may be based on one or more physical characteristics of the entity entering into the relationship. For example, in one particularly metaverse, only characters that belong to a wizard race may be allowed to enter into an enchanter/enchanted relationship as an enchanter. Similarly, perhaps only humans, elves, and werewolves are subject to enchantment. Furthermore, a particular metaverse may include requirements where characters must reach a certain age before they can marry.

Other conditions and or/requirements may be based on other factors such ownership of certain items, skills, experience or wealth, past playing history such as level(s) reached or experience gained, previous or current relationships or the like. For example, a character may only be allowed to form a parent/child relationship as a parent if the character is married. Alternatively, a character may only be allowed to be a coach in a sports team/coach relationship if the character has previously been a member of a sports team. As another example a character may only be allowed to enter into a government official/constituency relationship as a government official if the character has gained a certain level of wealth and "politician skill points." As a further example, a character may have to acquire a certain amount or type of land to enter into a master/slave relationship as a master. As a still further example, a character may need to reach a given advanced level in the game before becoming a God in a god/worshiper relationship. As another example, a first character may only be allowed to become a friend of a second character if the first and second characters already have one or more friends in common, such that the first character and the second character each have the same or corresponding relationship with a third character.

Alternatively or additionally, the number and/or type of relationships that a given or particular character may enter into may be limited. For example, all or some characters in the game may be limited to forming only a certain number of relationships. A character may be limited to a certain number of relationships at any one time, or the total number of relationships a character can form may be limited. Furthermore, such limitations may vary from character to character based on any number of factors or characteristics including, but not limited to, past experience in the game, previous number of relationships, wealth, race, satisfaction of previous relatives, etc.

Moreover, entry into some types of relationships may preclude entry into other types of relationships. For example, a sorcerer who has enchanted another player may be prohibited from entering into a worshiper/worshipee relationship. Such preclusion may be final, or may exist only for so long as the precluding relationship lasts.

Some requirements, such as those described in the examples above, may be relationship-specific. However, some or all of the requirements may apply to any player character wishing to enter into a relationship. For example, all player characters may have to reach a certain level in a game, complete a certain task, accumulate a certain item or skill, or fulfill a certain requirement in order to enter into a relationship.

As stated above, entry into a formalized relationship may provide a character with benefits and/or obligations that may not be available to characters who have not entered into the formalized relationship. For example, as explained above, a character may be required to have entered into a marriage relationship in order to enter into a parent/child relationship as a parent. Accordingly, only characters that have entered into a marriage relationship may receive the benefit (and/or obligation) of being a parent. As an alternative example, a game may require that a character can only complete a mission, reach a given level, obtain a certain item or learn a certain skill if they have entered into a relationship, the type of which may or may not be specified. For example, a player character may be required to have a spouse and at least one child before being able to run for mayor of a city.

Other examples of benefits from entering into relationships include the transfer of character attributes from one party in the relationship to the other. For example, a master may receive some or all of the character attributes generated by his slaves, children may inherit attributes of their parents, pet owners may start to look like their pets (or vice versa), the spouse of a doctor may have increased health points, etc. Furthermore, a first character who has a relationship with a second character may be able to provide an advantage (or disadvantage) to the second character that the first character would not normally be able to provide absent the relationship. For example, in a doctor/patient relationship, the doctor character may be able to shorten, lengthen, or restart the life of the patient character.

Relationships may be permanent or temporary. For example, relationships such as enchanter/enchanted or possessor/possessee may be limited by any number of factors including, for example, the passage of real-time, the passage of virtual time, or presence or absence of some other factor(s), such as an item, character, event, etc.

Similarly, the benefits and/or obligations provided by a relationship may also be permanent or temporary. For example, a player character may be required to have a spouse before being able to run for mayor of a city may be able to stay mayor even if the marriage is dissolved or the child character dies (in other words, the familial relationship may have ended, but the benefit of having been in a familial relationship may continue). Alternatively, some benefits may be removed, or subject to removal upon termination of a relationship. For example, an undead character may be given the characteristics of a living character for only so long as he possesses a living character.

As stated above, termination of a relationship may be the result of any number of factors. Non-limiting examples of circumstances under which a relationship may end include:
45. Termination by a party in the relationship—one or more parties to the relationship may be given the ability to sever the relationship. For example, one or more parties in a marriage may have the right to obtain a divorce, an enchanter may be able to utter a counterspell, or a team coach may quit. Such termination may or may not require the consent of the other party or parties in the relationship. 46. Cancellation of a game account—if a player cancels his game account, the server may be configured to terminate any relationships that have been made with a player character controlled by the player. 47. Termination due to lack of or limited activity—the server may be configured to terminate any relationships that have been made with a player character who has not logged enough play time over a given period of time. For example, it may be determined that it is detrimental to player characters to be in relationships with characters who are never around, accordingly, the server may be configured to monitor play time and automatically terminate relationships when a given character's playtime is below a certain threshold. Alternatively, such termination may not be automatic, but may be requested by or on behalf of a character who is harmed by the lack of playtime by a relative character. 48. Mutual ascent—the game server may be configured to terminate a relationship whenever all of the characters in the relationship agree to termination. A request for termination may be made by one or more parties to the relationship and the server may or may not be configured to try to obtain assent from any outstanding member(s). 49. Establishment of a conflicting relationship—when a character enters into a new relationship that conflicts with a prior relationship, the game server may be configured to automatically terminate the prior relationship. For example, a given sorcerer may only be allowed to enchant one NPC. If a sorcerer who has already enchanted a first NPC attempts to enchant a second NPC, the enchanter/enchantee relationship with the first NPC may be automatically terminated. Such termination may or may not be preceded by a warning or some type of indication that a relationship will soon be severed. 50. Upon the occurrence, or non-occurrence, of a predetermined event, such as the passage of time, completion of a task, presence or absence of an object, etc. The predetermined event itself as well as the likelihood and/or imminence of the occurrence or non-occurrence may or may not be known to some or all of the parties to the relationship. 51. Upon payment or non-payment—a character may be able or required to terminate a relationship by paying or receiving payment or not paying or not receiving payment from another character. Payment may be in the form of currency (real or virtual), attributes, items, knowledge, data, or the like. Such payment or non-payment options may or may not be known to some or all of the parties in the relationship.

Referring to FIG. 1, a network system 10 according to one embodiment includes a central server 20 in communication with a plurality of video game playing units 18. Those of ordinary skill in the art will appreciate that any number of video game playing units may be in communication with the central server. Typically, the number of video game playing units changes at various times as players join games and as players stop playing games. Similarly, more than one server may operate to coordinate the activities of the video game playing units, as is well known in the art.

Central server 20 may comprise any computing device (e.g., one or more computers) capable of communicating with other computing devices. The server 20 typically comprises a processor which is in communication with a storage device, such as an appropriate combination of RAM, ROM, hard disk, and other well known storage media. Central server 20 may comprise one or more personal computers, web servers, dedicated game servers, video game consoles, any combination of the foregoing, or the like.

Each video game device 18 may comprise any device capable of communicating with central server 20, providing video game information to a player, and transmitting the player's desired actions to the central server. Each video game device typically comprises a processor which is in communication with a storage device, such as an appropriate combination of RAM, ROM, hard disk, and other well known storage media. Suitable video game devices include, but are not limited to, personal computers, video game consoles, mobile phones, and personal data assistants (PDAs).

Some or all of video game 17 can be stored on central server 20. Alternatively, some or all of video game 17 may be stored on the individual video game devices 18. Typically, the video game devices are able to communicate with one another. Such communication may or may not be facilitated by central server 20. Accordingly, a player 19a accessing video game 17 via game device 18a may be able to play with a player 19b accessing video game 17 via game device 18b. As shown, it may be possible for multiple players (e.g. 19c, 19d) to access central server 20 via the same game device (e.g. 18c).

Regardless of whether video game 17 is stored on central server 20 or video game devices 18, server 20 is typically configured to facilitate play of the game between multiple game players.

Those having skill in the art will recognize that there is little distinction between hardware and software implementations. The use of hardware or software is generally a choice of convenience or design based on the relative importance of speed, accuracy, flexibility and predictability. There are therefore various vehicles by which processes and/or systems described herein can be effected (e.g., hardware, software, and/or firmware) and that the preferred vehicle will vary with the context in which the technologies are deployed.

At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the gaming environment described herein.

Figure 2:
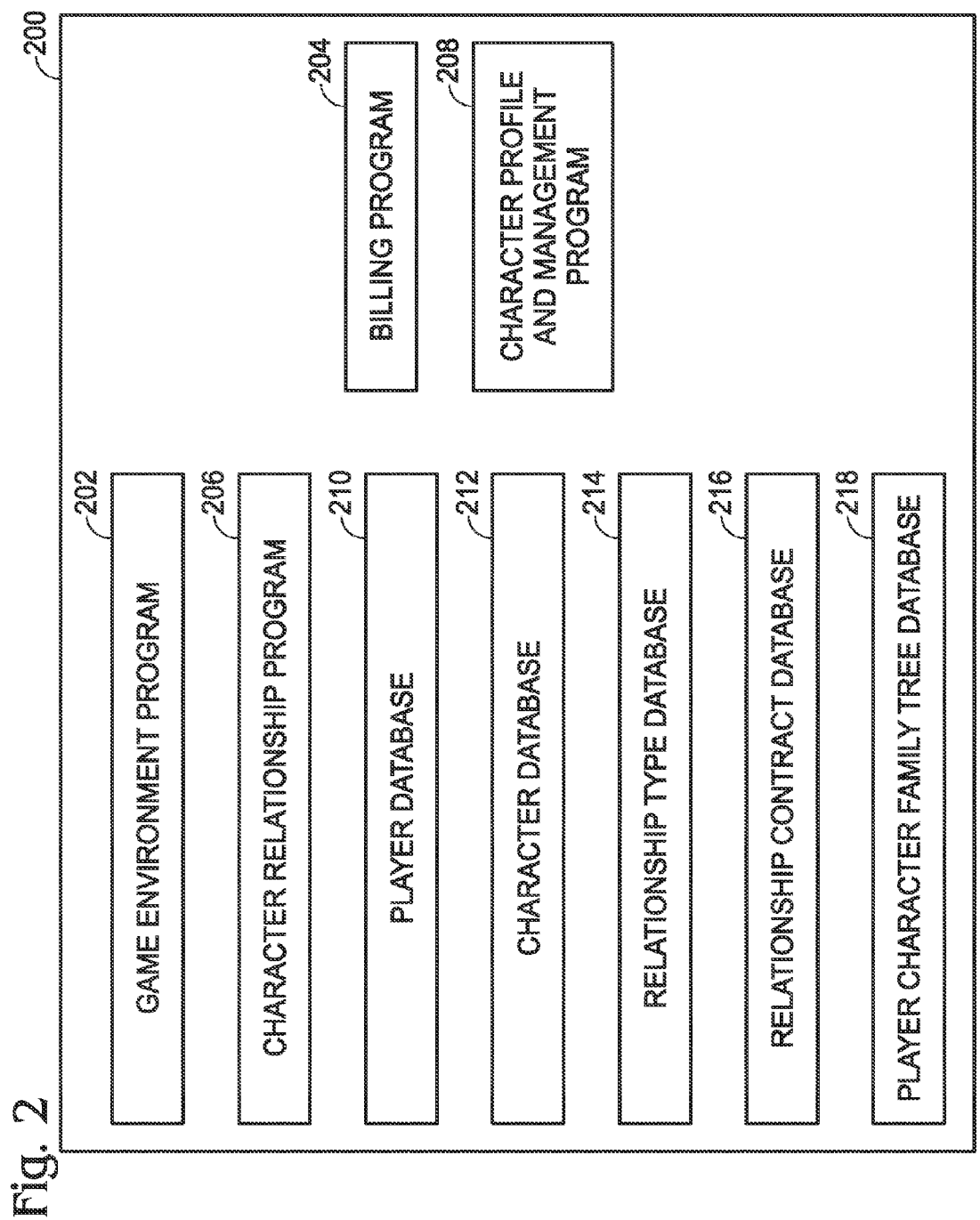
FIG. 2 illustrates a system according to an embodiment.

Turning now to FIG. 2, an exemplary system diagram is shown. It will be appreciated that a system configured to perform the various functions described herein may be configured in myriad ways and that any embodiment depicted or described in the current disclosure should be viewed only as an example of a system that could be used. Accordingly, for ease of understanding, various programs and databases are referred to by names that inform the reader as to the type of function a particular program could perform within the system. However, it will be appreciated that such functions could, in actuality, be performed by one or more programs operating independently or cooperatively and, moreover, that multiple or all described functions could be performed by a single program. Furthermore, it will be appreciated that a particular system may incorporate some, but not all, of the described programs and databases and could similarly incorporate additional programs or databases that are not described.

Accordingly, the system 200 in FIG. 2 includes: 52. Game Environment Program 202, which may be configured to provide and manage the virtual environment or virtual world described herein. 53. Billing Program 204, which may be configured to manage the various mechanisms by which players are able to purchase and pay for time spent playing the game or otherwise interacting with the virtual environment. 54. Character Relationship Program 206, which may be configured to provide and manage the relationships formed between various characters in the virtual environment. This program may include rules regarding the various benefits and obligations associated with each type of relationship that is allowed in the game environment, enforce obligations (or penalties), and bestow benefits. 55. Character Profile and Management Program 208, which may be configured to manage the various attributes, relationships, and actions of the characters in the virtual environment.

Furthermore, system 200 may includes a plurality of databases such as:

Player Database 210, which may be configured to store player-related data such as, but not necessarily limited to: 56. Player GUID 57. Player Billing Info 58. Player Characters 1-N 59. Account Type Character Database 212, which may be configured to store character (or avatar)—related data such as, but not necessarily limited to: 60. Player GUID 61. Character GUID 62. Character Attributes 1-*n* 63. Character Skills 1-*n* with Current Level 1-*n* 64. Character Relationship(s) 1-*n* (tree) 65. Relationship Type(s) 1-*n*

Relationship Type Database 214, which may be configured to store data related to the various types of relationships that are available in the game environment. Suitable data includes, but is not necessarily limited to: 66. Relationship Type ID 67. Relationship Type Name 68. Relationship Type Conditions/Restrictions 1-*n*

Relationship Contract Database 216, which may be configured to store data related to the specific relationship contracts that have been created in the game. Suitable data includes, but is not necessarily limited to: 69. Relationship Contract ID 70. Relationship Character 1-*n* (tree) 71. Relationship Conditions 1-*n*

Player Character Family Tree Database 218, which may be configured to track the various relationships and inter-relationships between multiple characters in the game environment. Suitable data includes, but is not necessarily related to: 72. Player Character ID 73. Player Character Relationship 1-*n* (tree)

It will be appreciated, that the systems described herein will be configured to perform various methods in order to provide the unique virtual environment experiences described herein.

Figure 3:
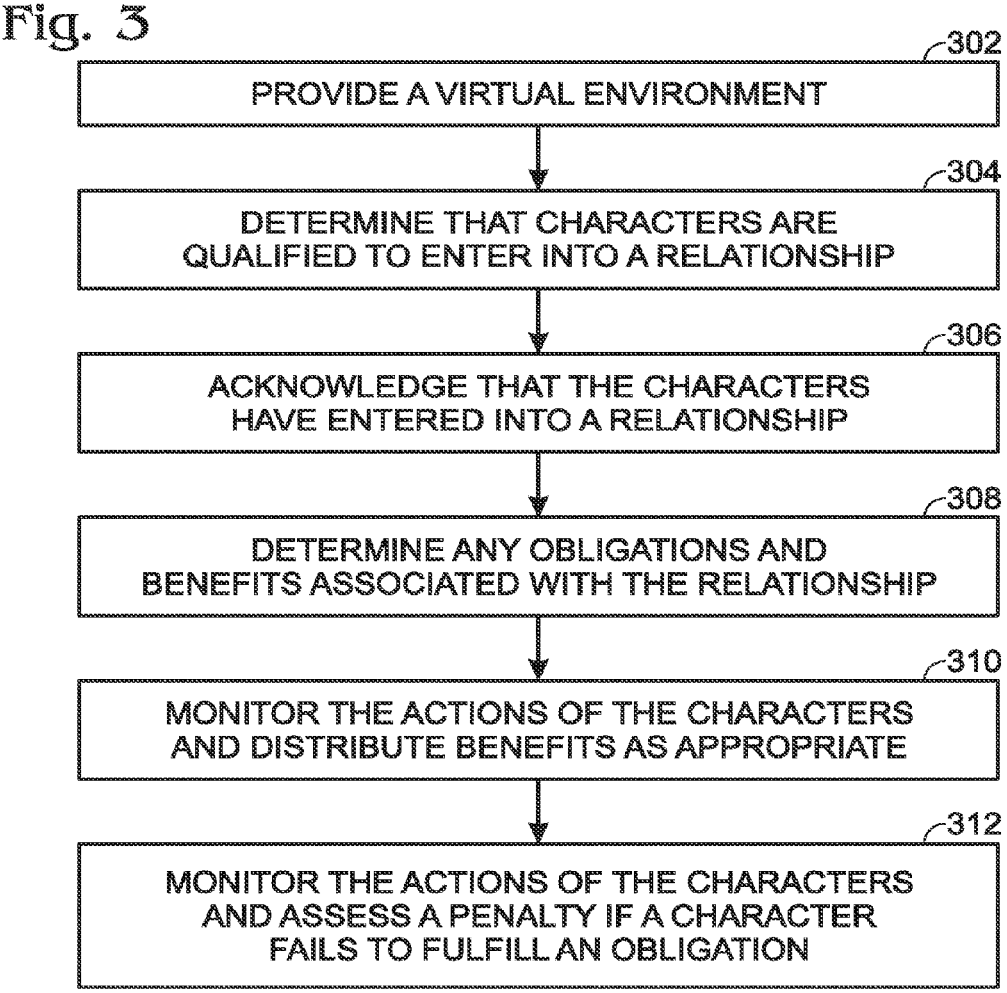
FIG. 3 illustrates an exemplary method according to an embodiment.

FIG. 3 and the following description provides one specific general method that might be employed by a system such as that described herein. At step 302, the method includes providing a virtual environment which is accessible by a plurality of players. As described in detail above, the environment may be accessible via a game system such as that shown in FIG. 1. According to an exemplary embodiment, players may interact with each other and the environment by controlling avatars. Those familiar with video games and virtual environments will be familiar with avatars as well as the various methods by which avatars may be created and controlled in a virtual environment. Typically, avatars are the products of one or more computer programs that may be created and provided by the game manufacturer. In some games player may select from between several different avatars. Furthermore, some games will allow for personalization of an avatar by a player. Still further, some games allow for the design and creation of an avatar by a player or third party.

At step 304, the method includes determining that a first player character is qualified to enter into a formalized relationship with a second character. The second character may be a player character or a non-player character (NPC). The qualifications necessary to enter into a formalized relationship typically depend upon the specific type of relationship that the character intends to enter into. Any given qualification may be one sided, such that only one player in the relationship need meet the qualification, or universal, meaning that all players in the relationship must meet the qualification. Furthermore, different relationships may require different qualifications for different parties. Exemplary relationships and qualifications for entry into those relationships are described in greater detail below.

At step 306, the method includes acknowledging that the characters have entered into a formalized relationship. Such acknowledgement may simply take the form of entering the existence of the relationship in a relationship database, such as database 216. Acknowledgement may also take the form of a permanent or temporary alteration of the appearance or other characteristic of an avatar that may or may not be noticeable to one or more characters in the virtual environment. For example, a married avatar may be shown with a ring on a finger. The ring may be visible to only the players controlling the married characters, or to all characters in the virtual environment.

At step 308, the method includes determining any obligations and benefits associated with the formalized relationship. Various obligations and benefits that may be associated with various relationships are described in detail below. Such obligations and benefits may be maintained, for example, in a database such as database 214. According to one embodiment, upon entry into a formalized relationship, the character accounts of each character in the relationship may be updated to reflect the various obligations and benefits associated with the relationship.

At step 310, the method includes monitoring the actions of the characters in the relationship and distributing benefits associated with the formalized relationship, as appropriate. For example, if a particular relationship requires that a first player character in the relationship receive a percentage of the strength points earned by the second player character, in the relationship, the system should be configured such that as strength points are earned by the second player, the required percentage of strength points are transferred to the first player character.

At step 312, the method includes monitoring the actions of the characters in the relationship and accessing a penalty if one of the characters in the relationship fails to fulfill an obligation associated with the relationship. For example, a particular type of relationship may require that one of the players aid another player in battle. If the player refuses to aid the other player, the system may be configured to assess a penalty. Examples of penalties include, but are not limited to, financial penalties, termination of the relationship, removal from the game, barrier from progression in the game, etc. The game may be configured such that a specific, predetermined, penalty is assessed for a given infraction. Alternatively, the game server or other entity, e.g. a tribunal of peer characters, may be provided with a list of penalties from which a given penalty may be selected specifically or at random.

Alternatively or additionally, system 200 may be configured to determine eligibility to form a relationship by performing the following steps: 74. Retrieve Player Character attributes 1-*n*. These character attributes may be retrieved, for example, from database 212. 75. Determine if attributes qualify for a relationship. This may be performed, for example, by comparing the character attributes in database 212 with the relationship conditions identified in database 214. 76. If attributes qualify for a relationship, flag character account as eligible for a relationship 77. Output relationship availability to player character. This may be performed, for example, by providing a text message, popup window, audible message or other indication to the player that the player character can enter into the desired relationship.

According to another method, system 200 may be configured to create a contract to establish relationship by performing the following steps: 78. Retrieve a request to form a relationship contract. For example, a player may be able to access a user interface in which the player can indicate information such as, though not necessarily limited to, the type of relationship to be entered, the other parties with whom the relationship will be entered, and the terms of the relationship. Of course it will be appreciated that according to different embodiments and different types of relationships, some or all of these items may be predetermined. Alternatively, or additionally, a request may take the form of an action performed by a character. For example, a character who wins a battle may automatically be perceived to have requested to enslave the population of the losing side of the battle. 79. Output relationship contract parameters. The contract parameters may include, for example, the parties and the conditions associated with the relationship. This information may be actively delivered to one or more parties in the relationship, for example, via a popup window, text message, audible signal, or the like. Alternatively such information may be made available in a special screen or area to which a player may navigate at his or her leisure. According to various embodiments, one or more parties in the relationship may have the ability to accept, decline, or modify one or more contract parameters or the contract altogether. 80. Receive relationship contract conditions. If conditions are provided by the parties to the relationship (or any third party) these conditions may be added to any conditions that are automatically included or required by the game server. 81. Create new relationship contract record. For example, the existence of the relationship and the conditions identified therein may be indicated in each party's character database 212, and/or relationship contract database 216. Furthermore, player character family tree database 218 may be updated.

In an embodiment, a module (e.g., accessible in the video game) permits a player to specify the "completion" of a task that defines an obligation under a contract. For example, the module can provide a graphical user interface (or other interface) that lets the obligation be defined. For example, the user interface can allow a player to select the obligation type (e.g., "deliver an in-game item"), select what in-game item must be delivered, and select to who (e.g., to which character) it must be delivered.

Obligations can also have meta-characteristics. For example, the user interface can permit a player to select whether there is a deadline for the obligation (e.g., click the DEADLINE radio button in the user interface), and select the deadline type. For example, deadline types may include "Specific Date" (which provides the player with a calendar from which the player selects the date), "Within the next X hours of game play" (which provides a box where the player can enter a number of days/hours/minutes/seconds), "Before the occurrence of another in-game event" (which provides a user interface allowing the player to select an in-game event type), "within the next X days of the occurrence of another in-game event" (which provides a user interface allowing the player to select an in-game event type and a number of days/hours/minutes/seconds).

A similar user interface can be used to permit players to modify obligations (e.g., in a counter offer to a proposal for contract). A similar user interface can be used to permit players to enter other obligations.

Alternatively or additionally, system 200 may be configured to form a relationship by performing the following steps: 82. Retrieve a request to view relationship contracts. Various relationship contracts may be made available to members of the virtual community via a message board, exchange, specialized website or web page, etc. A request to view relationship contracts may take the form of accessing a specific area of the game environment, a specialized user-interface, or sending a message using any known means to the game server, a third party, a member of the community, etc. 83. Determine relationship contracts availability based on player character account and relationship contract conditions. For example, a particular player character may only be allowed to view available relationship contracts for which that particular player character is eligible. For example, if a player character is a dwarf and dwarves are only allowed to marry other dwarves, the player character may only be shown available marriage contracts with other dwarves. 84. Output available relationship contracts. The available relationship contracts may be provided in the form of a popup window, on a game screen or as part of a separate screen, in the form of an email or text message, or in any other suitable format. 85. Receive an indication of acceptance of a relationship contract or a counter offer. Such indication may be provided, for example, by checking a check box, selecting a specific contract, or by performing a given action that is determined to be consistent with entry into the contract. For example, the action of giving or accepting a wedding ring to or from a second character may be effective to act as acceptance of a marriage contract with that second character. 86. Create Relationship based on agreed upon contract conditions, 87. Update relationship contract record, for example, by updating the appropriate databases.

System 200 may further be configured to sever or allow the severance of a relationship at a character's request by performing the following steps: 88. Receive request to terminate or sever a relationship contract. Such request may take the form of a written or oral request. Alternatively, a given character's actions may be determined to be effective as a request to sever a relationship contract. For example, a request to enter into the same type or relationship (such as marriage) with a third character that the character is in with a second character, may serve as an automatic request to sever the marital relationship with the second character. 89. Determine if request is permitted based upon relationship contract conditions. For example, relationship type database 214 may include conditions that must be met in order for a relationship to be terminated. 90. If request is permitted, sever relationship. 91. If request is not permitted, output additional conditions that must be met in order for relationship to be severed. For example, a spouse who requests divorce may be required to pay restitution to his or her soon to be ex-spouse before the marriage can be officially terminated. 92. Update relationship contract record, for example, by updating the data in relationship contract database 216 and family tree database 218.

System 200 may further be configured to automatically terminate or sever a relationship by performing the following steps: 93. Retrieve relationship contract 94. Determine if contract is eligible to be severed. For example, some contracts may exist for only a certain period of time or for only so long as some other condition exists. Accordingly, upon expiration of the time period or non-existence of the condition, the contract may be eligible for termination. 95. Output offer to sever contract to player characters 96. If offer is accepted, sever contract. Of course it will be appreciated that some contracts may be automatically severed, whether or not one or more of the parties want to sever the contract. For example, if a warlord is conquered by a rival, the warlord's slaves may automatically be freed, or transferred to the rival, whether or not the warlord agrees or desires for this to happen. 97. Update relationship contract record for example, by updating the data in relationship contract database 216 and family tree database 218.

System 200 may be configured to create a child character based on attributes of parents by performing the following steps: 98. Determine that a child relationship contract is available for two player characters, for example by reviewing the attributes of the player characters as identified in their character databases and comparing them with the parental relationship conditions in the relationship type database. 99. Receive indication that a player character desires to be a child of two player characters. As described in greater detail, according to some embodiments, a child may only be created in a given virtual environment if there exists a player who would like to control the child character that would be created by the two player characters who wish to be parents. 100. Generate a genetic profile of the child player character based in part on the genetic profile of the parent player characters. An method for creating such a genetic profile is described in greater detail in U.S. patent application Ser. No. 11/621,880 "Video Game including Child Character Generation Using Combination of Parent Character Attributes", filed Jan. 10, 2007, which is hereby incorporated by reference. 101. Create child player character with genetic profile.

System 200 may be configured to create a new player character related to existing player characters by performing the following steps: 102. Determine that a child relationship is available for one or more player characters, for example by reviewing the attributes of the player characters as identified in their character databases and comparing them with the parent-child relationship conditions in the relationship type database. 103. Receive (or generate) child relationship contract conditions. 104. Create child relationship contract 105. Receive new player character request, for example from a player who already controls one or more characters in the virtual environment, or from a new player. 106. Output available child relationship contracts. The contracts may be made available for players to view via any suitable means including for example, via an in or extra-game exchange, via a message board, via a game-related or third party website, etc. 107. Receive acceptance of child relationship contract. Such acceptance may take any suitable form including by checking a check box, selecting an available contract, or a character's action. 108. Create new player character that is a child of one or more existing player characters. This may involve, for example, creating a new player character database as well as updating any relationship contract and family tree databases.

System 200 may be configured to allow player character to receive game attributes for completing a game parameter only if a (specific) relationship with another player character exists. In such a case, system 200 may be configured to perform the following steps: 109. Receive indication that a game parameter has been completed by a player character 110. Determine if player character has a (specific type of) relationship with another player character 111. If relationship exists, release available game attributes for successful completion of game parameter Certain items in the game may only be obtained by a character from other characters which he has a formal relationship with. For example, a parent can only receive certain virtual herbs from his children. The goal is to make the players have relationships in order to be able to acquire skills and attributes in the game.

System 200 may be further configured to allow a player character to attempt to complete a game parameter only if a (specific) relationship with other player character exists. In such a case, system 200 may be configured to perform the following steps: 112. Receive request to attempt to complete a game parameter 113. Determine if player character has a (specific type of) relationship with another player character 114. Output "game parameter requires relationship message" if character does not have a relationship with another player character 115. Initiate game parameter if player character has a relationship with another player character.

It will be appreciated that a metaverse enables people from all over the world to interact with the virtual environment and each other in a myriad of simple and complex ways and that such relationships may similarly take a myriad of simple and complex forms, which may or may not mirror those types of relationships that exist in the real world. Accordingly, any number and type of formalized relationships may be created in a metaverse and such relationships may be bound by or include any number of complex rules, guidelines, requirements, benefits, obligations, etc. Therefore, it should be understood that while a number of specific relationships are described below, the present disclosure should in no way be considered as limited to only those relationships described herein. Moreover, the relationships described herein should in no way be considered as requiring or being limited to only those specific manifestations herein described. That being said, various examples of suitable in-game relationships and the rules that may be associated therewith are described below:

Marriage—Two players in a game reach a certain level of the game and are qualified to be married. The characters log in to a special screen of the game that displays other characters that are available to be married. Characters can display conditions for the marriage i.e. they need a certain dowry, prenuptials or will only marry a character of a certain class or level, or with sufficient resources, income or skills to contribute to the marriage. A player character can accept a marriage proposal or submit a counter offer. When both players agree to the terms of the marriage, then the system sets a flag in both of the character accounts indicating their newly formed relationship.

Characters may or may not need to be of the same race, class, nationality, profession, language origin, or the like, in order to marry each other. Different groups of characters could have different marriage arrangements and/or requirements. For instance Taurens could enter into plural marriages (i.e. polygamy or polyandry) while Elves could only be monogamous marriages. Humans could get married upon reaching level 10 while elves could not be married until they reach level 15. Some groups could have multiple marriages, where each marriage has a fixed time limit.

Entry into a marital relationship may result in various benefits and obligations for the married parties. For example, parties in a marital relationship may be required or allowed to provide assistance to their spouse. Assistance may, for example, take the form of temporary or permanent transfers of attributes, including, but not necessarily limited to health points, strength points, intelligence points or the like. Alternatively or additionally, assistance may, for example, take the form of help in solving a puzzle, fighting a battle, or completing a task. As a further addition or alternative, assistance may, for example, take the form of a temporary or permanent loan or transfer of one or more possessions or other in-game items such as, for example, a weapon, spell, tool, currency, etc. Furthermore, as described in greater detail throughout this disclosure, marriage may be a prerequisite for a variety of other actions or activities in the game environment.

Parent/Child—a player character may decide or qualify to become a parent. The player character may have to have reached a given level in the game before he or she is qualified to become a parent. A single parent and/or the child of a single parent may face challenges, receive detriments, and/or receive benefits that are not available to multi-parent relationships.

Some parenting relationships may require that two (or more) characters be married to each other (or have formed some other type of permanent or temporary relationship) before they can have a child. Once two characters form a parenting-eligible relationship, one or both of them may be required to reach a certain level of the game before they can have a child.

Once a character, or group of characters, has qualified to become a parent, the character accounts of the qualified characters may be flagged to indicate that they are eligible to have children.

The formation of parent/child relationships may be used as a barrier to entry for the game. A new player may only be allowed to enter the game as a child character, and a child character may only be introduced into the game when one or two (e.g., if marriage is a prerequisite) other players are eligible to have a child. One or more of the parent characters may or may not be required to agree to have a child before a new player character can be formed and the new player allowed to enter the environment as the child character.

The system may provide mechanisms by which players can design some or all aspects of the avatar of the child character they wish to assume. A new player can specify what gender, race and class he wants the child character to be. The system may further be able to indicate the general availability of parents that would be suitable for the child as designed. For example, the system may be able to display what gender, races and classes of characters need or want more children. The system may provide a display showing the family trees of player characters already in the game that are married (or otherwise qualified to have children) and that desire children.

Various characteristics of a child character may be limited, enhanced, or otherwise affected by characteristics of the child's parents. For example, parents of a given class may only have children within a certain subset of classes. For instance, the children of a union between a rogue and a wizard might be limited to being either warriors or paladins. Additional criteria can be set up by the new player or the parents to further establish the relationship between them. For instance, parents can set up a contract with the child so that they take a certain percentage of his experience or game attributes, but agree to leave all of their wealth to the child in their will when they die. New characters can set parameters for becoming a child, for instance, the new player child may agree to give his parent(s) a certain percentage of his future experience points, in exchange for certain attributes or other tangible or intangible property when his parent(s) acquire them. Once the parents and the child have agreed to a contract, the new player character is born into the game and is added to the family tree of the parents. The new child may then begin to play the game and strive to gain wealth and attributes, etc. New players can elect to give a greater amount of their experience or game attributes to parents who are in a good family or who otherwise have desirable traits, attributes, wealth, etc. So called "Bad families" will have a cheaper "barrier to entry" for new players than "good families."

A new player can choose to have his player inserted into different ages based on different servers.

Some groups of characters may be able to have children under limited conditions, i.e. without marriage, in poverty, during war, etc. In these cases, children entering the game may suffer from deficits in income, attributes, or other characteristics. These deficits may plague the player throughout his life or only during childhood. An advantage of becoming a child under such circumstances may be that there are fewer or no barriers to entry.

Affair—According to some embodiments, the attributes of children in the game environment are determined by the attributes of the parents who sire the children. Accordingly, in some instances, a married couple may not be able to produce offspring that compliment their team playing abilities. For instance, a family may need more healers to have a well rounded fighting force, but none of the parents can have healers as children based on their attributes, class, or other factors. In this instance, a player character, once he reaches a certain level, can have an affair with a family member of another family in order to produce children of a specific class (or having specific abilities, etc.). Children generated in this manner may be members of one or both families. Various rules may determine which family may absorb the child. For example, a defined ability such as strength may be used to determine family membership for the child, i.e. the stronger player may have the right to absorb the child into their family first. The weaker player character may then have the right negotiate a contract with the stronger player character in order to provide a child for his family. In this manner, a family lacking in a certain class of character can go outside the family to generate those class types in their family, but must pay for the privilege by providing game attributes to the non family member who agrees to have the affair.

Incest—Absent all other options to bear children, close family members may have children. In such cases, the offspring shall be created in a manner similar to all other child bearing methods, except that, there shall be a greater probability of the offspring being defective in one or more ways. Such defects might include an inability to obtain certain attributes or use certain objects, weapons or tools. Another defect type might be a general constraint on the speed with which a child achieves various objectives, levels, karma, or other attributes. The degree to which these defects manifest themselves in such offspring may be determined randomly or predetermined by a set of rules enforced by the server or peer-to-peer network.

Divorces—a marriage between two or more characters can be terminated by a third party decree, such as through a divorce proceeding. A divorce proceeding may be instituted at the behest of all or only some of the parties in the marriage. A virtual environment may include a player character or NPC who acts a judge. The judge may have the ability to split up the property and/or attributes of the divorcing parties. Alternatively, prior to or during a marriage, the married parties may decide to enter into a contractual agreement, such as a prenuptial agreement, that governs the distribution of the marital assets.

Slave/Master—A first player character may be captured by second player character in the game. The first player character may then be made a slave to the second player character. Ownership of a slave may provide a character with various benefits while being a slave may bestow various penalties or disabilities to a character. According to some embodiments, slaves may be considered to be members of their master's family and may or may not receive any benefits from being a family member.

For example, according to some embodiments, some or all of the slave's experience, attributes, skills, possessions or the like may be transferred or under the control of a slave's master until the slave is freed. Alternatively, various attributes or the like associated with the master may be automatically increased via ownership of a slave, regardless of the particular attributes associated with the particular slave that has been captured.

A game may include one or more methods by which a slave can be freed. For example, a slave can be freed by payment of a ransom. The payment may be made by the slave, a member of the slave's family, or some other third party. In some embodiments, the master can put out a ransom note, or provide some other indication of the amount of ransom or other conditions that may be fulfilled in order for a particular or group of slaves to be freed. The game may provide a user interface which allows players to view the ransom or other freedom conditions. The players that are able to view the ransom or other freedom conditions may be limited to only the slave, only family members of the slave, some other group or subset of players in the game, or may be widely available to all members of the gaming community. For example, family members of the slave or the slave himself may be able to log in to a special screen in the game to view the conditions of the ransom to free the slave. If the family members or the slave agree to and/or meet the conditions of the ransom, the slave may be freed.

Alternatively, a slave may be freed from one master by being captured by another master or an individual or group that intends to free the slave.

A slave may be freed by his master, for any or no reason at all.

All the slaves owned by a particular organization, country, or other entity may be freed based upon the outcome of a war. For example, if a General and his Army defeats another General's Army, the victorious General may choose to free all the slaves owned by the defeated General or entity controlling the defeated General's Army through an "emancipation proclamation."

Freed slaves may have all that was taken from them returned, plus optional penalties that are established by the Game Server or within a peer-to-peer network or as otherwise agreed upon by the players. Alternatively, Generals (and/or other ex-masters) may agree to conditions of surrender, which may determine the disposition of any slaves or other spoils of war. In such case, slaves may be freed but they may receive only a portion or none of their previously lost wealth or other attributes.

As stated above, characters who are captured and forced to be slaves may be given penalties or other disabilities. Examples of penalties that may be imposed on a slave include, but are not limited to: 116. Slaves can play in the game in a limited capacity until they are free. 117. Slaves can be cut off from communication with their family. 118. Slaves can commit suicide to start over in the game. In some embodiments, this could result in bad karma or some other penalty for the player character, resulting in a low reentry status or other negative effects to the restarted character.

Slaves may also be given various rights. For example, according to various embodiments, 119. Slaves can create their own contracts with other player characters who can free them from being slaves. 120. Slaves can bargain with their masters to free them for a proscribed initial or future, i.e., to be paid price.

According to some embodiments, slaves may be transferred from one master to another master. Such transfers may take place as payment for contractual obligations, as a trade, as a sale, or for any other reason. In some embodiments, the game may include a marketplace wherein slaves may be sold or auctioned. Such marketplaces may or may not be exclusive to the sale or trade of slaves.

Enchanter/Enchanted—According to some embodiments, certain characters, such as undead characters, can build up their army/family by enchanting other player characters. This method of increasing a family may be used in addition to or instead of the methods described above. When an undead character reaches a certain level, they are eligible to enchant a "living" player character and cause them to be undead. These newly undead players than are removed from their current family tree and added to the undead family tree. To become living again, an undead player would have to be unenchanted by a device or spell provided by his family or by paying another Enchanter to provide the spell for a fee. Alternatively, once a player character has become undead, their family can only kill them and allow them to be reentered into their family further down the family tree via reincarnation.

According to some embodiments, if an undead character is killed, then the undead character that created them can be allowed to make another character undead. i.e. an undead character who has earned a credit to enchant a living character can reuse it if that living character that has become undead is killed.

Gods/Worshipers—Some characters, i.e. the first characters that sign on to a server, can be made Gods of their races. These gods can have some control of rules governing the entire game environment and can also bless or curse characters. Player characters can become blessed by offering attributes to the gods. They can nullify a curse by offering attributes to a god. Gods may be player characters or, in certain game versions, NPCs.

In some embodiments, the goal of a god is for his or her worshipers to rule or otherwise control the world. In order to achieve this, a god may add extra incentives to parent/child contracts so that new player characters join their religion over other alternative religions.

In some embodiments, gods can enter into battles with each other or other entities. According to some embodiments, the strength of a god may be based on, increased by, or otherwise affected by the strength of their worshipers.

The number of characters that can be gods in a given game environment may or may not be limited. If the number is limited, a new or existing character may be allowed to achieve god status upon the defeat, death, or disappearance of a previously existing god character.

Boss/Employee—according to one embodiment, new player characters can be introduced into a game as employees of a boss. Once player characters reach certain levels or acquire certain attributes in a game environment, they are eligible to take on new players as employees. Employees have to give a certain amount of the experience or game attributes they acquire to their boss in exchange for the position and/or protection. If either party fails to fulfill the terms of the contract, the contract can be nullified and his boss no longer employs the employee. The contract may include terms that control contract dissolution. This particular type of relationship may be very successful in a mafia style game.

Available employment contracts may be posted on an in-game message board or available for viewing by players through some other means. For example, characters may be able to log into a special screen in the game to view employment contracts of other player characters. These contracts may be formed and governed using the methods described, for example, in U.S. patent application Ser. Nos. 11/355,232 and 11/624,662, each of which is hereby incorporated by reference. Furthermore, the contracts may be made available on a virtual exchange such as that described in U.S. patent application Ser. No. 11/560,456, which is also incorporated by reference.

Government Officials—According to one embodiment, various relationships may be formed between characters based on the relationship between a governing body and its constituency. Formation of the governing body may take any means, including, for example, through various voting systems, appointment, brute force, etc.

The methods and systems formed by and between governing bodies and their constituencies may vary from governed group to governed group. Furthermore, a particular group of people may transitions, quickly or slowly, from one form of government to another during a game.

According to one method of determining who should be a government official, characters may be required to fulfill one or more characteristics in order to qualify to be part of a governing body. These characteristics may includes various character attributes including, but not limited to, strength (e.g. achieving a particular number of strength points), intelligence (e.g. achieving a particular level of intelligence or receiving a particular level of education), race (e.g. a character may need to a dwarf in order to govern a group of dwarves) and the like. Characteristics may also include factors such as amount of time spent in the game, by either or both the particular character and/or the player controlling the character, past experience(s) in the game by either the particular character or the player controlling the character, etc. For example, a particular government may require that in order for a character to become a government official, the character must have spent at least 20 game hours playing the game and be controlled by a player who has spent at least 35 game hours playing the game. The government may further require that the character (or controlling player) have accomplished some particular feat in the game, such as solving a particular puzzle, winning a race, being the first to reach a particular level in the game, or winning a particular battle. Alternatively or additionally, the government may require that the character (or player) have experienced or taken part in some event in or associated with the game, such as being a slave, building public infrastructure, work as a game official, etc.

Qualification, i.e. fulfillment of the characteristics, may result in automatic appointment to a government position or in eligibility for appointment, election, entry into a contest or battle, etc. In any given virtual environment, various different government entities employing various different styles of government, or non-government (i.e. anarchist states) may co-exist. For example, the human race can have a republic government with votes for party members. The Tauren race can have a monarchy and determine government position based on lineage or which player is the strongest. These different governments may or may not engage in battles to establish supremacy and/or to spread their rule and form of government.

As part of the relationship between a government official and his or her constituencies, a government official may be entitled to various benefits. For example, a government official may be able to take an experience or attribute tax from other players. Alternatively or additionally, similar to the god-worshiper relationship described above, the character attributes of a government official may or may not be affected by the character attributes of his or her constituencies. For example, the strength score of a government official who, by himself, has a rather low strength score, but who governs a group of people who, as a whole have rather high strength scores, may have a relatively higher strength score when acting as a government official.

According to some embodiments, government officials may be removed from office according to various methods. For example, in an electoral government, player characters may challenge current government officials in future elections, which may occur at prescribed times/dates or when a majority of players in a given governed group agree to hold new elections. An elected official may also be removed from government if his land, people, wealth, etc. are conquered by another group, or if he himself is captured by someone else. A group of governed people may stage an uprising and oust their current official. Various other forms of government may simply allow one or more individuals to govern on a rotational basis and such leadership may then be terminated upon the end of a predetermined term length or other basis.

Sports Teams/Coaches—According to some embodiments, multiple characters and/or NPCs may form a sports team. Any given team may or may not include one or more coach. Any suitable method may be employed by a coach or sports team to recruit players and create or expand a team. As non-limiting examples, teams may be able to expand or replace their membership through informal or formal recruiting, lottery, drafting, assignment, etc. from a pool of player characters and/or NPCs who may or may not have indicated their desire to join a team. As a specific example, a coach can recruit new player characters to be on his team based on how well his team is doing against other teams. In this example, a coach can receive points for winning matches and, when a certain number of points have been obtained, he can be entitled to recruit new player characters to be on his team.

In some embodiments, player characters can be traded from one team to the next. Such trades may or may not be for other players, for example, player characters on a team can alternatively be traded for game points, game credits or attributes. The trades may or may not be with the consent of the traded or non-traded members of the team. There may or may not be a specific trading window which may or may not close at a given time during a season or off-season.

According to some embodiments, there may be a virtual bench that coaches can recruit from if they meet certain qualifications, such as having a certain amount of success, or lack thereof, or if other player characters on the team can no longer or are no longer available to play due to trade, injury, quitting or leaving the game, or death.

Alternatively or additionally, a coach may be given the right to obtain one or more additional players with specific skill sets. Such right may be granted in order to help the coach improve his team, for example. Moreover, such right may be granted randomly or at predetermined time periods or intervals. As an example, if one team were to become so strong that it consistently dominates all other teams, the Game Server or peer-to-peer network may grant one or more of the underperforming teams the right to add sufficient additional players with appropriate skills and experience so as to make them better able to compete against the dominate team.

General/Soldier—According to various embodiments, a game environment may allow for the formation of a relationship between the general and one or more soldiers. A player character who is a general can recruit new player characters into his army when he successfully defeats another army in combat. New player characters entering the game environment can elect to join an army based on available slots and offers in contracts. A weaker army would have to give more to new recruits in order to have them join. A contract to join an army could include: 121. A rank or position in the army 122. A salary 123. A % of spoils obtained by the army 124. One or more attributes (swords, etc)

According to some embodiments, in order to help ensure competitiveness between armies, or for other reasons, the Game Server or peer-to-peer network may randomly or via proscribed rules, grant rights to underperforming teams to obtain new soldiers for free or for reduced fees.

A general/soldier relationship may provide various benefits and obligations to and from the general and soldier. For example, a soldier may be required to perform the tasks assigned to or requested of him by the general. In return, the general may agree to provide certain compensation, or necessities such as food and shelter. Furthermore, a player character may chose to enter into a general/soldier relationship as a soldier (or general) in order to gain various attributes (such as strength, or experience points), gain various items (such as wealth accumulated as spoils as war) or in order to fulfill a prerequisite for another position in the environment, such as a government official.

Guilds—Player characters in a virtual environment may decide to form one or more guilds. Traditionally, though not necessarily, guilds are formed by players who have similar skill sets (e.g. an artists guild) or who perform the same type of work (e.g. an assassins guild.) A guild may or may not include some form of hierarchical leadership structure. The methods and systems by which a guild can grow or create membership may be dictated by various rules and requirements. For example, in one example, a player character in charge of a guild may not be able to add other player characters to the tuild unless either he or his guild have obtained a certain level in the game, completed certain game parameters, or acquired enough game attributes to qualify to add characters to the guild. New player characters coming into the guild can do so with a contract that can be negotiated before they join the game environment. Players in a guild can renegotiate contracts with their guild, or can be recruited to other guilds who offer competitive contracts.

Membership in a guild, as well as positions of leadership within the guild, if any, may come with various benefits and obligations. A contract between the guild member and the guild may or may not encompass all of the benefits and obligations of guild membership. Different guild members may or may not have different benefits and obligations and such benefits and obligations may or may not be dependant upon a member's leadership position in the guild. Guilds may or may not act as unions in their interactions with other guilds or entities within the virtual world, by which it is meant that a guild may or may not be enabled to leverage a collective bargaining power in order to establish, maintain, or sever, relationships with other entities in the virtual world.

The invention is described with reference to several embodiments. However, the invention is not limited to the embodiments disclosed, and those of ordinary skill in the art will recognize that the invention is readily applicable to many other diverse embodiments and applications. Accordingly, the subject matter of the present disclosure includes all novel and nonobvious combinations and subcombinations of the various systems, methods and configurations, and other features, functions, and/or properties disclosed herein.

The herein described aspects and drawings illustrate components contained within, or connected with other components that permit play in the virtual environment. It is to be understood that such depicted designs are merely exemplary and that many other designs may be implemented to achieve the same functionality. Any arrangement of components to achieve the same functionality is effectively associated such that the desired functionality is achieved. FIG. 1 provides an exemplary network which may be used to support a virtual environment.

Of course it will be appreciated that the systems methods described herein are provided for the purposes of example only and that none of the above systems methods should be interpreted as necessarily requiring any of the disclosed components or steps nor should they be interpreted as necessarily excluding any additional components or steps.

What is claimed is:

1. A method performed by a computer, the method comprising:

providing, by a Video Game Central Server, a virtual environment accessible by a plurality of players,
wherein the players are able to interact with the virtual environment and each other via characters;
receiving, by the Video Game Central Server, a request from a first player character to enter into a formalized relationship with a second character;
determining, by the Video Game Central Server, if the first player character is qualified to enter into a formalized relationship with a second character;
creating, by the Video Game Central Server, the formalized relationship between the first player character and the second character;
monitoring, by the Video Game Central Server, the actions of the first player character in the virtual environment;
determining, by the Video Game Central Server, if an action taken by the first player character is inconsistent with the formalized relationship created between the first player character and the second character;
receiving, by the Video Game Central Server, from the second character a command to terminate the formalized relationship;
terminating, by the Video Game Central Server, the formalized relationship.

2. The method of claim 1 wherein creating the formalized relationship between the first player character and the second character comprises
identifying benefits that are associated with the formalized relationship and bestowing the benefits upon the first player character.

3. The method of claim 1 wherein creating the formalized relationship between the first player character and the second character comprises
identifying at least one obligation that is associated with the formalized relationship and imposing the obligation upon the first player character.

4. The method of claim 3 wherein imposing an obligation comprises
assessing a penalty if the first player character does not satisfy the imposed obligation.

5. The method of claim 1 further comprising:
receiving a request from the first player character to terminate the relationship;
determining if the first player character is qualified to terminate the relationship; and
terminating the relationship.

6. The method of claim 5 wherein terminating the relationship comprises
terminating any benefits that would have been bestowed had the formalized relationship still existed.

7. The method of claim 5 wherein terminating the relationship comprises
refraining from assessing any penalties for failure to meet an obligation had the formalized relationship.

8. The method of claim 1 wherein an action is inconsistent with a formalized relationship if it is a request to enter into the same type of formalized relationship with a third character.

9. The method of claim 1 further comprising
asking the second character if they would like to enter into the formalized relationship.

10. An apparatus comprising:
a processor; and
a computer readable medium in communication with the processor;
in which the computer readable medium stores instructions which, when executed by the processor, direct the processor to provide a virtual environment accessible by a plurality of players,
   wherein the players are able to interact with the virtual environment and each other via characters;
receive a request from a first player character to enter into a formalized relationship with a second character;
determine if the first player character is qualified to enter into a formalized relationship with a second character;
create the formalized relationship between the first player character and the second character;
monitor the actions of the first player character in the virtual environment;
determine if an action taken by the first player character is inconsistent with the formalized relationship created between the first player character and the second character;
receive from the second character a command to terminate the formalized relationship;
terminate the formalized relationship.

11. The apparatus of claim 10, in which the computer readable medium stores instructions which, when executed by the processor, direct the processor to
   generate a user interface which permits a player to specify the completion of a task that defines an obligation under a contract.

12. The apparatus of claim 10 wherein creating the formalized relationship between the first player character and the second character comprises
   identifying at least one obligation that is associated with the formalized relationship and imposing the obligation upon the first player character.

13. The apparatus of claim 12 wherein imposing an obligation comprises
   assessing a penalty if the first player character does not satisfy the imposed obligation.

14. The apparatus of claim 10, in which the computer readable medium stores instructions which, when executed by the processor, direct the processor to:
   receive a request from the first player character to terminate the relationship;
   determine if the first player character is qualified to terminate the relationship; and
   terminate the relationship.

* * * * *